(12) United States Patent
Gopinath et al.

(10) Patent No.: US 6,609,093 B1
(45) Date of Patent: Aug. 19, 2003

(54) METHODS AND APPARATUS FOR PERFORMING HETEROSCEDASTIC DISCRIMINANT ANALYSIS IN PATTERN RECOGNITION SYSTEMS

(75) Inventors: Ramesh Ambat Gopinath, Millwood, NY (US); Mukund Padmanabhan, White Plains, NY (US); George Andrei Saon, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 09/584,871

(22) Filed: Jun. 1, 2000

(51) Int. Cl.[7] .......................... G10L 15/08; G10L 15/12
(52) U.S. Cl. .................. 704/236; 704/243; 382/190
(58) Field of Search ................. 704/231–246, 704/251–257, 249, 250; 382/190, 276, 277, 181, 191, 192

(56) References Cited

U.S. PATENT DOCUMENTS 5,091,972 A * 2/1992 Kwon et al. ................ 382/277
5,473,728 A * 12/1995 Luginbuhl et al. .......... 704/243
6,137,909 A * 10/2000 Greineder et al. .......... 382/190

OTHER PUBLICATIONS

Lapedes, McGraw–Hill Dictionary of Physics and Mathematics, 1978 by McGraw–Hill, Inc., definition of "homoscedastic", p. 458.*
R.O. Duda et al., "Pattern Classification and Scene Analysis," Wiley, New York, Chapter 3, pp. 44–84, 1973.
K. Fukunaga, "Introduction to Statistical Pattern Recognition," Academic Press, New York, Chapter 10, pp. 441–507, 1990.

E.G. Schukat–Talamazzini et al., "Optimal Linear Feature Space Transformations for Semi–Continuous Hidden Markov Models," Proceedings of ICASSP '95, pp. 369–372, 1994.

N. Kumar et al., "Heteroscedastic Discriminant Analysis and Reduced Rank HMMs for Improved Speech Recognition," Speech Communication, vol. 26, pp. 283–297, 1998.

R.A. Gopinath, "Maximum Likelihood Modeling with Gaussian Distributions for Classification," Proceedings of ICASSP '98, Seattle, pp. 661–664, 1998.

(List continued on next page.)

Primary Examiner—David D. Knepper
(74) Attorney, Agent, or Firm—Tax Ann Dang; Ryan Mason & Lewis, LLP (57) ABSTRACT

The present invention provides a new approach to heteroscedastic linear discriminant analysis (HDA) by defining an objective function which maximizes the class discrimination in the projected subspace while ignoring the rejected dimensions. Moreover, we present a link between discrimination and the likelihood of the projected samples and show that HDA can be viewed as a constrained maximum likelihood (ML) projection for a full covariance gaussian model, the constraint being given by the maximization of the projected between-class scatter volume. The present invention also provides that, under diagonal covariance gaussian modeling constraints, applying a diagonalizing linear transformation (e.g., MLLT—maximum likelihood linear transformation) to the HDA space results in an increased classification accuracy. In another embodiment, the heteroscedastic discriminant objective function assumes that models associated with the function have diagonal covariances thereby resulting in a diagonal heteroscedastic discriminant objective function.

21 Claims, 3 Drawing Sheets

OTHER PUBLICATIONS

M.J.F. Gales, "Semi–Tied Covariance Matrices for Hidden Markov Models," IEEE Transactions on Speech and Audio Processing, vol. 7, pp. 272–281, 1999.

R. Haeb–Umbach et al., "Linear Discriminant Analysis for Improved Large Vocabulary Continuous Speech Recognition," Proceedings of ICASSP '92, vol. 1, pp. 13–16, 1992.

N.A. Campbell, "Canonical Variate Analysis—A General Model Formulation," Australian Journal of Statistics, vol.26(1), pp. 86–96, 1984.

K. Demuynck, et al., "Optimal Feature Sub–Space Selection Based On Discriminant Analysis," Proceedings of Eurospeech '99, Budapest, Hungary, pp. 1311–1314, 1999.

S.R. Searle, "Matrix Alegbra Useful for Statistics," Wiley Series in Probability and Mathematical Statistics, New York, Chapter 12, pp. 320–345, 1982.

M. Padmanabhan et al., "Recent Improvements in Voicemail Transcription," Proceedings of Eurospeech '99, Budapest, Hungary, pp. 503–506, 1999.

* cited by examiner

| DIAGONAL COVARIANCE (134K PROTOTYPES) | | |
|---|---|---|
| SYSTEM | IMPR. OBJ. FN. | WER |
| BASELINE (MFCC) | – | 39.61% |
| MFCC+MLLT | 5.35% | 37.33% |
| LDA | – | 39.60% |
| LDA+MLLT | 2.01% | 36.63% |
| HDA | 1.14% | 40.22% |
| HDA+MLLT (MLD) | 3.94% | 35.62% |
| DHDA | 7.34% | 37.11% |

| FULL COVARIANCE (16.5K PROTOTYPES) | |
|---|---|
| SYSTEM | WER |
| BASELINE (MFCC) | 37.72% |
| LDA | 39.68% |
| HDA | 36.22% |

FIG. 5B

| SYSTEM | DIM. | IMPR. OBJ. FN. | WER |
|---|---|---|---|
| BASELINE (MFCC) | 39 | – | 45.80% |
| LDA | 60 | – | 43.16% |
| LDA+MLLT | 60 | 2.10% | 40.46% |
| HDA | 60 | 6.23% | 54.89% |
| HDA+MLLT (MLD) | 60 | 15.26% | 39.67% |
| DHDA | 60 | 8.67% | 40.66% |

METHODS AND APPARATUS FOR PERFORMING HETEROSCEDASTIC DISCRIMINANT ANALYSIS IN PATTERN RECOGNITION SYSTEMS

The U.S. Government has a paid-up license in this invention and the right in limited circumstances to require the patent owner to license others on reasonable terms as provided for by the terms of contract no. MDA972-97-C-0012 awarded by the Defense Advanced Research Project Agency (DARPA).

FIELD OF THE INVENTION

The present invention relates generally to pattern recognition systems and, more particularly, to methods and apparatus for performing discriminant feature space analysis in pattern recognition systems such as, for example, speech recognition systems.

BACKGROUND OF THE INVENTION

State-of-the-art speech recognition systems use cepstral features augmented with dynamic information from the adjacent speech frames. The standard MFCC+Δ+ΔΔ scheme (Mel-Frequency Cepstral Coefficients plus first and second derivatives, or delta and double delta), while performing relatively well in practice, has no real basis from a discriminant analysis point of view. The same argument applies for the computation of the cepstral coefficients from the spectral features: it is not clear that the discrete cosine transform, among all linear transformations, has the best discriminatory properties even if its use is motivated by orthogonality considerations.

Linear discriminant analysis (LDA) is a standard technique in statistical pattern classification for dimensionality reduction with a minimal loss in discrimination, see, e.g., R. O. Duda et al., "Pattern Classification and Scene Analysis," Wiley, New York, 1973; and K. Fukunaga, "Introduction to Statistical Pattern Recognition," Academic Press, New York, 1990, the disclosures of which are incorporated by reference herein. Its application to speech recognition has shown consistent gains for small vocabulary tasks and mixed results for large vocabulary applications, see, e.g., R. Haeb-Umbach et al., "Linear Discriminant Analysis for Improved Large Vocabulary Continuous Speech Recognition," Proceedings of ICASSP '92, Volume 1, pp. 13–16, 1992; E. G. Schukat-Talamazzini et al., "Optimal Linear Feature Space Transformations for Semi-Continuous Hidden Markov Models," Proceedings of ICASSP '95, pp. 369–372, 1994; and N. Kumar et al., "Heteroscedastic Discriminant Analysis and Reduced Rank HMMs for Improved Speech Recognition," Speech Communication, 26:283–297, 1998, the disclosures of which are incorporated by reference herein.

One reason could be because of the diagonal modeling assumption that is imposed on the acoustic models in most systems: if the dimensions of the projected subspace are highly correlated then a diagonal covariance modeling constraint will result in distributions with large overlap and low sample likelihood. In this case, a maximum likelihood feature space transformation which aims at minimizing the loss in likelihood between full and diagonal covariance models is known to be very effective, see, e.g., R. A. Gopinath, "Maximum Likelihood Modeling with Gaussian Distributions for Classification," Proceedings of ICASSP '98, Seattle, 1998; and M. J. F. Gales, "Semi-tied Covariance Matrices for Hidden Markov Models," IEEE Transactions on Speech and Audio Processing," 7:272–281, 1999, the disclosures of which are incorporated by reference herein.

Secondly, it is not clear what the best definition for the classes should be: phone, subphone, allophone or even prototype-level classes can be considered, see, e.g., R. Haeb-Umbach et al., "Linear Discriminant Analysis for Improved Large Vocabulary Continuous Speech Recognition," Proceedings of ICASSP '92, Volume 1, pp. 13–16, 1992, the disclosure of which is incorporated by reference herein. Related to this argument, the class assignment procedure has an impact on the performance of LDA; EM-based (Expectation Maximization algorithm based) approaches which aim at jointly optimizing the feature space transformation and the model parameters have been proposed, see, e.g., the above-referenced E. G. Schukat-Talamazzini et al. article; the above-referenced N. Kumar et al. article; and the above-referenced M. J. F. Gales article.

Chronologically, the extension of LDA to Heteroscedastic Discriminant Analysis (HDA) under the maximum likelihood framework appears to have been proposed first by E. G. Schukat-Talamazzini in the above-referenced article (called maximum likelihood rotation). N. Kumar, in the above-referenced N. Kumar et al. article, studied the case for diagonal covariance modeling and general (not necessarily orthogonal) transformation matrices and made the connection with LDA. Following an argument of Campbell, in N. A. Campbell, "Canonical Variate Analysis—A General Model Formulation," Australian Journal of Statistics, 26(1):86–96, 1984, the disclosure of which is incorporated by reference herein, N. Kumar showed that HDA is a maximum likelihood solution for normal populations with common covariances in the rejected subspace. In R. A. Gopinath, "Maximum Likelihood Modeling with Gaussian Distributions for Classification," Proceedings of ICASSP '98, Seattle, 1998, the disclosure of which is incorporated by reference herein, a maximum likelihood linear transformation (MLLT) was introduced which turns out to be a particular case of Kumar's HDA when the dimensions of the original and the projected space are the same. Interestingly, M. J. F. Gales' global transform for semi-tied covariance matrices, in the above-referenced M. J. F. Gales article, is identical to MLLT but applied in the model space (all other cases are feature space transforms). Finally, Demuynck in K. Demuynck, et al., "Optimal Feature Sub-space Selection Based On Discriminant Analysis," Proceedings of Eurospeech '99, Budapest, Hungary, 1999, the disclosure of which is incorporated by reference herein, uses a minimum divergence criterion between posterior class distributions in the original and transformed space to estimate an HDA matrix.

Thus, as suggested above, LDA is known to be inappropriate for the case of classes with unequal sample covariances. While, in recent years, there has been an interest in generalizing LDA to HDA by removing the equal within-class covariance constraint, as mentioned above, there have not been any substantially satisfactory approaches developed. One main reason for this is because existing approaches deal with objective functions related to the rejected dimensions which are irrelevant to the discrimination of the classes in the final projected space. Thus, a need exists for an improved HDA approach for use in pattern recognition systems.

SUMMARY OF THE INVENTION

The present invention provides a new approach to heteroscedastic linear analysis (HDA) by defining an objective function which maximizes the class discrimination in the projected subspace while ignoring the rejected dimensions. Accordingly, in one aspect of the invention, a method for use in a pattern recognition system of processing feature vectors extracted from a pattern signal input to the system, comprises the following steps. First, a projection matrix is formed based on a heteroscedastic discriminant objective function which, when applied to the feature vectors extracted from the pattern signal, maximizes class discrimination in a resulting subspace associated with the feature vectors, while ignoring one or more rejected dimensions in the objective function. The projection matrix is then applied to the feature vectors extracted from the pattern signal to generate transformed feature vectors for further processing in the pattern recognition system. For example, further processing may comprise classifying the transformed features associated with the input pattern signal. It may also include filtering, re-ranking or sorting the output of the classification operation.

In addition, we present a link between discrimination and the likelihood of the projected samples and show that HDA can be viewed as a constrained maximum likelihood (ML) projection for a full covariance gaussian model, the constraint being given by the maximization of the projected between-class scatter volume.

The present invention also provides that, under diagonal covariance gaussian modeling constraints, applying a diagonalizing linear transformation (e.g., MLLT—maximum likelihood linear transformation) to the HDA space results in an increased classification accuracy.

In another embodiment of the invention, the heteroscedastic discriminant objective function assumes that models associated with the function have diagonal covariances thereby resulting in a diagonal heteroscedastic discriminant objective function. This is referred to as diagonal heteroscedastic discriminant analysis (DHDA).

As will be explained below, the methodologies of the present invention are generally applicable to pattern recognition systems such as, for example, a speech recognition system. However, the invention may be applied to many other domains which employ pattern recognition, for example, any classification problem based on real-valued features. In addition to speech recognition, examples of such classification problems may include: handwriting recognition; optical character recognition (OCR); speaker identification; 2-dimensional (2D) or 3-dimensional (3D) object recognition in a 2D or 3D scene; forensic applications (e.g., fingerprints, face recognition); and security applications; just to name a few.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

For ease of reference, the detailed description is divided into the following sections: (I) Linear Discriminant Analysis; (II) Heteroscedastic Discriminant Analysis Extension; (III) Likelihood Interpretation; (IV) Illustrative Embodiments; and (V) Experimental Results. Section I provides a description of the basics of Linear Discriminant Analysis (LDA). Section II provides a description of the Heteroscedastic Discriminant Analysis (HDA) extension according to the present invention. Section III provides a description of the use of likelihood interpretation in accordance with HDA according to the invention. Section IV provides a description of an illustrative pattern recognition system and methodology employing HDA according to the present invention. Finally, Section V provides a description of some experimental results associated with the present invention.

I. Linear Discriminant Analysis

Consider a set of N independent vectors $\{x_i\}_{1 \leq i \leq N}$, $x_i \in \mathbb{R}^n$, each of the vectors belonging to one and only one class $j \in \{1, \ldots, J\}$ through the subjective mapping of indices l: $\{1, \ldots, N\} \rightarrow \{1, \ldots J\}$. It is to be understood that f: A B is called surjective if for $\forall y \in B$, $\exists x \in A$ such that f(x)=y. Let each class j be characterized by its own mean $\mu_j$, covariance $\Sigma_j$, and sample count $N_j$, where the standard definitions hold:

$$\mu_j = \frac{1}{N_j} \sum_{i \in l^{-1}(j)} x_i, \quad \sum_j = \frac{1}{N_j} \sum_{i \in l^{-1}(j)} x_i x_i^T - \mu_j \mu_j^T$$

and $$\sum_{j=1}^{J} N_j = N.$$

The class information is condensed into 2 scatter matrices called:

(i) within-class scatter: $W = \frac{1}{N} \sum_{j=1}^{J} N_j \sum_j$ and (ii) between-class scatter: $B = \frac{1}{N} \sum_{j=1}^{J} N_j \mu_j \mu_j^T - \bar{\mu}\bar{\mu}^T$.

The goal of LDA is to find a linear transformation f: $\mathbb{R}^n \rightarrow \mathbb{R}^p$, y=f(x)=θx, where x is an n-dimensional real vector and is the argument of the function f and where y is the p-dimensional vector resulting from the application of f (or θ) to x, with θ being a p×n matrix of rank p≦n, such that the following ratio of determinants is maximized:

$$J(\theta) = \frac{|\theta B \theta^T|}{|\theta W \theta^T|}. \quad (1)$$

where T represents a matrix transpose, and |.| represents the determinant of a matrix.

Even though the objective function in equation (1) is non-linear, there is a closed form solution given by the transposed eigenvectors corresponding to the p largest eigenvalues of the generalized eigenvalue problem: $Bx=\lambda Wx$, where $\lambda$ is an eigenvalue which satisfies $Bx=\lambda Wx$ and where x is called the corresponding eigenvector. A proof and an extensive discussion of LDA can be found in K. Fukunaga, "Introduction to Statistical Pattern Recognition," Academic Press, New York, 1990, the disclosure of which is incorporated by reference herein.

II. Heteroscedastic Discriminant Analysis Extension

In accordance with the present invention, let us consider the individual weighted contributions of the classes to an objective function represented as:

$$\prod_{j=1}^{J} \left( \frac{|\theta B \theta^T|}{|\theta \sum_j \theta^T|} \right)^{N_j} \frac{|\theta B \theta^T|^N}{\prod_{j=1}^{J} |\theta \sum_j \theta^T|^{N_j}} \quad (2)$$

or, by taking log and rearranging terms, we get:

$$H(\theta) \triangleq \sum_{j=1}^{J} -N_j \log \left| \theta \sum_j \theta^T \right| + N \log |\theta B \theta^T|. \quad (3)$$

H has two very useful properties of invariance. For every nonsingular matrix $\psi \in \mathbb{R}^{p \times p}$, $H(\psi\theta)=H(\theta)$. This means that subsequent feature space transformations of the range of $\theta$ will not affect the value of the objective function. Moreover, like LDA, the HDA solution is invariant to linear transformations of the data in the original space. The invariance is in the following sense: if $$x| \xrightarrow{\phi} z, \quad \phi \in \mathbb{R}^{n \times n}$$

nonsingular and $\hat{\theta}=\arg \max_\theta H_z(\theta)$ then $\hat{\theta}\phi=\arg \max_\theta H_x(\theta)$. A second remark is that no special provisions have to be made for $\theta$ during the optimization of H except for $|\theta\theta^T| \neq 0$; the objective function is invariant to row or column scalings of $\theta$ or eigenvalue scalings of $\theta\theta^T$. Using matrix differentiation results as are known in the art, e.g., S. R. Searle, "Matrix Algebra Useful for Statistics," Wiley Series in Probability and Mathematical Statistics, New York, 1982, the disclosure of which is incorporated by reference herein, the derivative of H is given by:

$$\frac{dH(\theta)}{d\theta} = \sum_{j=1}^{J} -2N_j \left( \theta \sum_j \theta^T \right)^{-1} \theta \sum_j + 2N(\theta B \theta^T)^{-1}\theta B. \quad (4)$$

Figure 1:
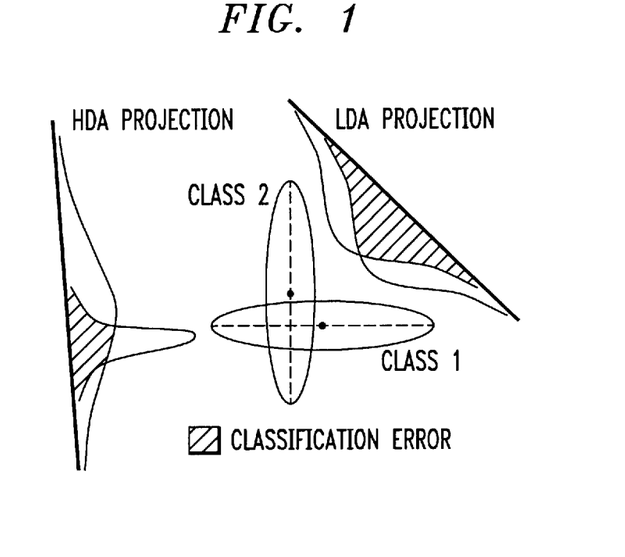
FIG. 1 is a diagram illustrating differences between linear discriminant analysis and heteroscedastic discriminant analysis.

Unfortunately, $H'(\theta)=0$, where H' represents the derivative of H, has no analytical solution for the stationary points. Instead, we use a quasi-Newton conjugate gradient descent routine from the NAG (Numerical Algebra Group) Fortran library for the optimization of H. FIG. 1 illustrates a case where LDA and HDA provide very different answers. Specifically, FIG. 1 shows the projections (i.e., the $\theta$'s) found by LDA and HDA according to the invention for two classes (i.e., Class 1 and Class 2) having distributions represented by the ellipses. HDA is better because, as shown, the classification error in the projected space (i.e., the hatch-shaded area) is smaller than that for LDA.

For $J=2$ classes with $N_1=N_2$, there is an interesting connection between H and the Bhattacharyya distance, as is known in the art, e.g., K. Fukunaga, "Introduction to Statistical Pattern Recognition," Academic Press, New York, 1990, the disclosure of which is incorporated by reference herein, in the range of $\theta, \rho(\theta)$, namely $2\rho(\theta) > H(\theta)/N$, where:

$$\rho(\theta) = \frac{1}{2} trace\{(\theta W \theta^T)^{-1} \theta B \theta^T\} + \frac{1}{2} \log \frac{|\theta W \theta^T|}{\sqrt{\left|\theta \sum_1 \theta^T\right|\left|\theta \sum_2 \theta^T\right|}}. \quad (5)$$

Since $e^{-\rho(\theta)}$ is an upper bound on the Bayes classification error rate, $$e^{-\frac{H(\theta)}{2N}}$$

becomes a (looser) upper bound too. Therefore, maximizing H amounts to minimizing this bound and, thus, the error rate.

III. Likelihood Interpretation

Consider $\{y_i \in \mathbb{R}^p y_i = \theta_{x_i}, 1 \leq i \leq N\}$, the projected samples onto the HDA space. Assuming a single full covariance gaussian model for each class, the log likelihood of these samples according to the induced ML (maximum likelihood) model $\hat{\mu}_j = \theta \mu_j$ and $\hat{\Sigma}_j = \theta \Sigma_j \theta^T$, $1 \leq j \leq J$, is $$\sum_{j=1}^{J} -\frac{N_j}{2} \log |\hat{\Sigma}_j| - \frac{N_p}{2} \log(2\pi) = \sum_{j=1}^{J} -\frac{N_j}{2} \log \left|\theta \sum_j \theta^T\right| + C. \quad (6)$$

It may be seen that the summation in H is related to the log likelihood of the projected samples. Thus, $\theta$ can be interpreted as a constrained ML projection, the constraint being given by the maximization of the projected between-class scatter volume (the term $\log |\theta B \theta^T|$).

Next, let us consider the case when diagonal variance modeling constraints are present in the final feature space. The maximum likelihood linear transform, e.g., as described in the above-referenced R. A. Gopinath article and the above-referenced M. J. F. Gales article, aims at minimizing the loss in likelihood between full and diagonal covariance gaussian models. The objective is to find a transformation $\psi$ that maximizes the log likelihood difference of the data, i.e.:

$$\hat{\psi} = \arg \max_{\psi \in \mathbb{R}^{p \times p}} \sum_{j=1}^{J} -\frac{N_j}{2} \left( \log \left| diag \left( \psi \sum_j \psi^T \right) \right| - \log \left| \psi \sum_j \psi^T \right| \right) \quad (7)$$

$$\arg \max_{\psi \in \mathbb{R}^{p \times p}} \sum_{j=1}^{J} -\frac{N_j}{2} \log \left| diag \left( \psi \theta \sum_j \theta^T \psi^T \right) \right| + N \log |\psi|.$$

Recall that, as previously explained, HDA is invariant to subsequent feature space transformations, hence the objective function of equation (3) is the same for the composite transform $\psi\theta$ as for $\theta$. We will refer to this composite transform as the "maximum likelihood discriminant" (MLD) projection. An important observation is that $\psi$ in equation (7) does not necessarily have to be square. By means of equation (3) and equation (7), an HDA and an MLLT-type projection can be combined through the following function (to be maximized):

$$G(\theta) = \sum_{j=1}^{J} -N_j \log \left| diag\left(\theta \sum_{j} \theta^T\right) \right| + N\log|\theta B \theta^T|. \quad (8)$$

We refer to this scheme as the diagonal HDA (DHDA) projection. Kumar in the above-referenced N. Kumar et al. article defined the following feature space transformation: $g: \mathbb{R}^n \to \mathbb{R}^n$, $y = g(x) = \bar{\theta}x$, where $\bar{\theta} = [\theta_{(p)}{}^T \theta'_{(n-p)}{}^T]^T$ is partitioned into two matrices corresponding, respectively, to the projected and the rejected subspace. The objective is to maximize $K(\bar{\theta})$, the likelihood of the transformed samples subject to diagonal modeling constraints and common covariance in the rejected subspace:

$$K(\bar{\theta}) = \sum_{j=1}^{J} -N_j \log \left| diag\left(\theta \sum_{j} \theta^T\right) \right| - N\log|diag(\theta' T \theta'^T)| + 2N\log|\bar{\theta}| \quad (9)$$

where T=W+B, represents the total scatter of the data. Even though equation (8) appears to resemble equation (9), they provide different answers in practice because maximizing the DHDA objective function is directly related to maximizing the between class separation in the projected space, $|\theta B \theta^T|$, whereas for Kumar's HDA, the assumption is that this is done implicitly by minimizing $|diag(\theta'^T \theta'^T)|$. This is one main reason why the existing approaches are deficient, i.e., because they deal with objective functions related to the rejected dimensions which are irrelevant to the discrimination of the classes in the final projected space. Indeed, the two quantities are related through the following chain of inequalities:

$$|diag(\theta' T \theta'^T)| \geq |\theta' T \theta'^T| \geq |\theta' B \theta'^T| \geq \frac{|\bar{\theta}|^2 |B|}{|\theta B \theta^T|}. \quad (10)$$

Here we have used Hadamard's inequality, $|diag(A)| \geq |A|$, valid for any symmetric positive definite (SPD) matrix A. The second and third inequalities follow from observing that $|A+B| \geq |A|$ for SPD matrices A and B and by representing $$|\bar{\theta} B \bar{\theta}^T| = |\theta B \theta^T||\theta' B \theta'^T - \theta' B(\theta^T(\theta B \theta^T))^{-1} \theta B \theta'^T|,$$

according to the above-referenced S. R. Searle text. Accordingly, it follows that $$G(\theta) \geq K(\bar{\theta}) + N|B| \text{ for all } \bar{\theta} = ([\theta^T \theta'^T])^T.$$

IV. Illustrative Embodiments

Figure 2:
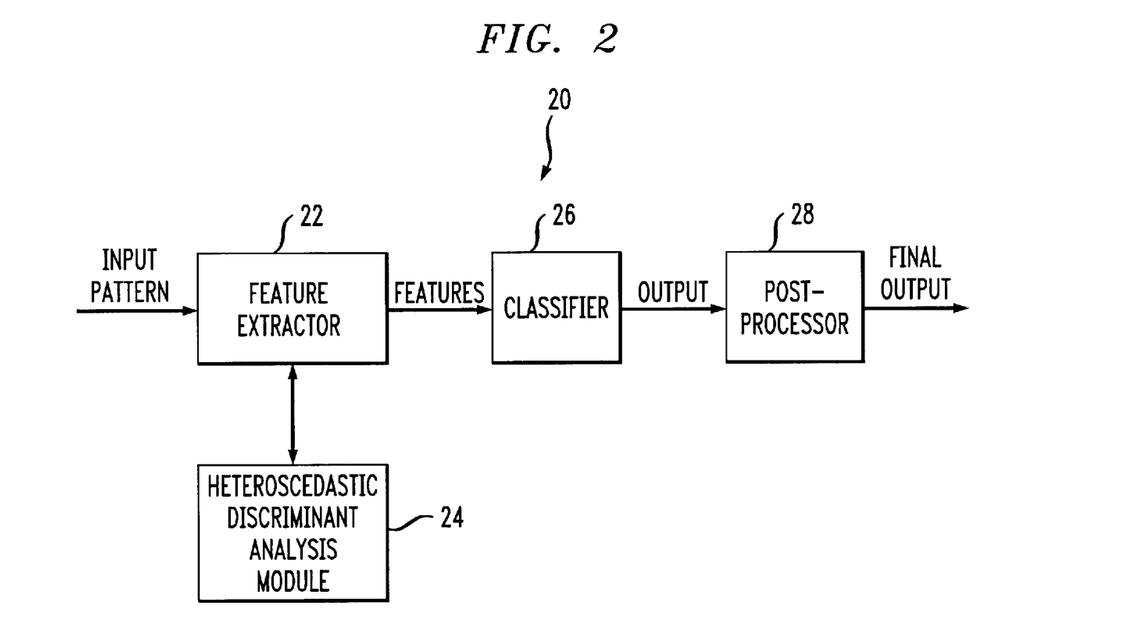
FIG. 2 is a block diagram of an illustrative pattern recognition system employing a discriminant analysis methodology according to the invention.

Referring now to FIG. 2, a block diagram is shown of an illustrative pattern recognition system employing a discriminant analysis methodology according to the invention. The system 20 comprises a feature extractor 22, an HDA module 24, a classifier 26 and a post-processor 28. It is to be appreciated that the HDA module 24 performs the heteroscedastic discriminant analysis (section II) and diagonal HDA (section III) of the invention, as described above and as will be summarily described below in the context of FIG. 3 which illustrates a discriminant analysis methodology of the invention employed by module 26.

As is well known, the feature extractor receives the input pattern and extracts spectral features (dimensions) from the signal at regular intervals. The spectral features are in the form of feature vectors (signals) which are then passed on to the classifier 26. After the spectral features are extracted from the input pattern, but before the feature vectors are provided to the classifier, the HDA module performs heteroscedastic discriminant analysis and maximum likelihood operations, as described herein. The output of the module is the projected or transformed features which are provided to the classifier 26, through the feature extractor. Of course, the transformed features could be provided directly to the classifier from module 24.

The classifier 26 receives the feature vectors and predicts the class membership of the sample based on the extracted feature vectors. During training, a classifier learns a mapping from inputs (features) to outputs (classes).

The output of the classifier 26 is then provided to the post-processor 28 which may filter the outputs of the classifier according to various criteria. The post-processor may also re-rank or sort the outputs based on additional knowledge.

As mentioned above, the methodologies of the present invention are generally applicable to pattern recognition systems such as, for example, a speech recognition system. However, the invention may be applied to many other domains which employ pattern recognition, for example, any classification problem based on real-valued features, e.g., handwriting recognition, optical character recognition (OCR), speaker identification, 2-dimensional (2D) or 3-dimensional (3D) object recognition in a 2D or 3D scene, forensic applications (e.g., fingerprints, face recognition), security applications, etc.

In the case of speech, by way of example only, generalized speech recognition systems such as the commercially available large vocabulary IBM ViaVoice, ViaVoice Gold, or ViaVoice Millennium Pro systems (trademarks of IBM Corporation of Armonk, N.Y.) may be adapted to permit and/or perform discriminant analysis in accordance with the invention.

It is to be appreciated that the block diagram of FIG. 2 may also be considered as representing an illustrative speech recognition system. While not shown, the speech recognition system includes, prior to the feature extractor 22, a speech utterance pre-processor which receives the speech uttered by a user and generates representative speech waveforms, i.e., a speech signal. The speech utterance pre-processor may include, for example, an audio-to-analog transducer (microphone) and an analog-to-digital converter which respectively transduce the utterances into an electrical signal and then convert the electrical signal into a digital signal representative of the speech uttered. Further, the pre-processor may sample the speech signal and partition the signal into overlapping frames so that each frame is discretely processed by the remainder of the system. The output signal of the pre-processor is the sampled speech waveforms or speech signal (i.e., input pattern of FIG. 2) which is recorded and provided to a feature extractor 22. The function of the feature extractor 22 is explained above in conjunction with the operations of the HDA module 24 of the invention. The transformed spectral features are in the form of feature vectors which are then passed on to the classifier 26 which, in the case of speech, is referred to as a hypothesis search module.

As is known, the hypothesis search routine performed by the module is substantially controlled by four components:

(i) an acoustic vocabulary; (ii) a language model vocabulary; (iii) an acoustic model; and (iv) a language model. Specifically, the hypothesis search routine hypothesizes a sequence of words from the acoustic vocabulary and computes a score for the hypothesis. Subsequently, the hypothesis with the best score is output as the recognized or decoded sequence. The process of computing the score consists of two steps: (i) computing an acoustic model score; and (ii) computing a language model score. The language model score is related to linguistic constraints and tries to capture the grammatical constraints in the particular language. The acoustic model score relates to the probability distribution of the feature vectors for a given hypothesis. The probability of a sequence of feature vectors is computed using a parameterized probability density function, and this constitutes the acoustic model score. The acoustic and language vocabularies define the words that can be used to construct the hypothesis.

In a speech recognition embodiment, the post-processor 28 may be a natural language understanding (NLU) module or a dialog manager which parses the output of the hypothesis search module and identifies valid phrases or commands which make sense in a given context.

Advantageously, it is to be appreciated that by employing discriminant analysis according to the invention in the speech recognition system, the word error rate is reduced thereby increasing the performance accuracy of the speech recognition system.

Figure 3:
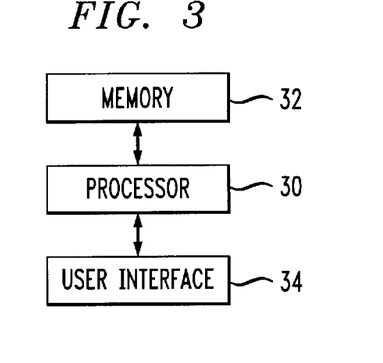
FIG. 3 is a block diagram of an illustrative hardware implementation of pattern recognition system employing a discriminant analysis methodology according to the invention.

Referring now to FIG. 3, a block diagram is shown of an illustrative hardware implementation of a pattern recognition system employing a discriminant analysis methodology according to the invention (e.g., as illustrated in FIG. 2). In this particular implementation, a processor 30 for controlling and performing pattern recognition including discriminant analysis according to the invention is coupled to a memory 32 and a user interface 34. It is to be appreciated that the term "processor" as used herein is intended to include any processing device, such as, for example, one that includes a CPU (central processing unit) and/or other processing circuitry. For example, the processor may be a digital signal processor, as is known in the art. Also the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "user interface" as used herein is intended to include, for example, one or more input devices, e.g., keyboard, for inputting data to the processing unit, and/or one or more output devices, e.g., CRT display and/or printer, for providing results associated with the processing unit. In the case where the pattern recognition system is processing speech signals, the user interface 34 may also include a portion of the speech utterance pre-processor, mentioned above, such as the microphone for receiving user speech.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements illustrated in FIG. 2 may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Figure 4:
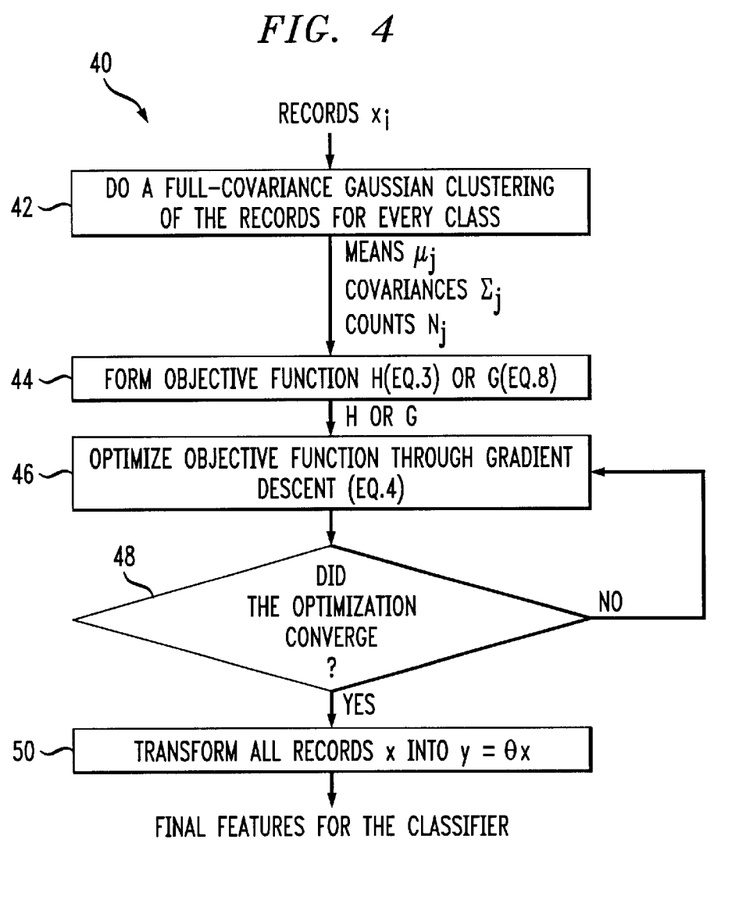
FIG. 4 is a flow diagram illustrating a discriminant analysis methodology according to the invention.

Referring now to FIG. 4, a flow diagram is shown illustrating a discriminant analysis methodology according to the invention. As mentioned above, the methodology 40 shown in FIG. 4 may be performed in accordance with the HDA module 24 shown in FIG. 2. Also, the flow diagram approximately summarizes the operations described above in sections II and III. In fact, the following description makes reference back to the equations presented in these sections.

It is to be understood that the input to this methodology 40 is a set of n-dimensional record files, one record file for each class. The output is the transformed features associated with the records projected in accordance with the p×n projection matrix $\theta$.

Thus, in step 42, a full-covariance gaussian clustering is performed on the records $x_i$ for every class. This yields means $\mu_j$, covariances $\Sigma_j$, and sample counts $N_j$. Then, in step 44, an objective function is formed according to the invention. As explained above, this may be objective function H, as defined in equation (3), when heteroscedastic discriminant analysis (section II) is to be performed plus maximum likelihood linear transformation (MLLT); or objective function G, as defined in equation (8), when diagonal HDA (section III) is to be performed. In step 46, the objective function formed is optimized through gradient descent, as defined in equation (4). The process then determines, in step 48, whether the optimization converged. If no, the process repeats step 48. If yes, all records x are transformed using the p×n projection matrix $\theta$ associated with the objective function, in step 50. The resulting records y, where y=$\theta$x, represent the final features provided to the classifier.

V. Experimental Results

Figure 5A:
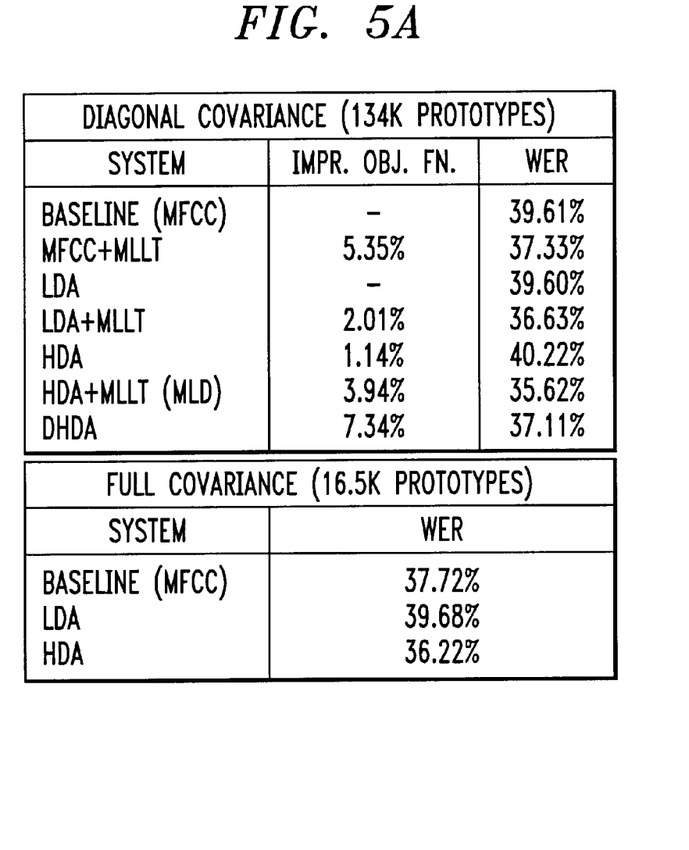
FIGS. 5A and 5B are tabular representations of experimental results associated with conventional discriminant analysis and discriminant analysis according to the invention.

The first set of experiments was conducted on a voicemail transcription task, as described in M. Padmanabhan et al., "Recent Improvements in Voicemail Transcription," Proceedings of EUROSPEECH '99, Budapest, Hungary, 1999. The baseline system has 2313 context dependent states and 134K diagonal gaussian mixture components. The test set consists of 86 messages (approximately 7000 words). The baseline system uses 39-dimensional frames (13 cepstral coefficients plus deltas and double deltas computed from 9 consecutive frames). For the LDA and HDA versions, every 9 consecutive 24-dimensional cepstral vectors were spliced together forming 216-dimensional feature vectors which were then clustered to make possibly multiple full covariance models for each state (totaling around 3K gaussians). Subsequently, a 39×216 transformation, $\theta$, was computed using the objective functions for LDA (equation (1)), HDA (equation (3)), and DHDA (equation (8)), which projected the models and feature space down to 39 dimensions. As mentioned in the above-referenced R. Haeb-Umbach et al. article, it is not clear what the most appropriate class definition for LDA and HDA should be. The best results were obtained by considering each individual gaussian as a separate class, with the priors of the gaussians summing up to one for every state. After the computation of the LDA or HDA projection, the vectors were reclustered in the projected space to form a new set of 39-dimensional full covariance models (13.5K). An MLLT transformation, $\psi$, was then computed to maximize the objective function (equation (7)), leading to a composite LDA+MLLT and HDA+MLLT (MLD) feature space. The HDA and the DHDA optimizations were initialized with the LDA matrix. The parameters of the baseline system (with 134K gaussians) were then re-estimated in the transformed spaces. The table of FIG. 5A summarizes the improvements in the objective functions and the word error rates (WER) for the different systems. In order to assess the effectiveness of the HDA transform alone, we have also trained full covariance systems in the different spaces whose results are indicated in the bottom half of the table of FIG. 5A.

Figure 5B:
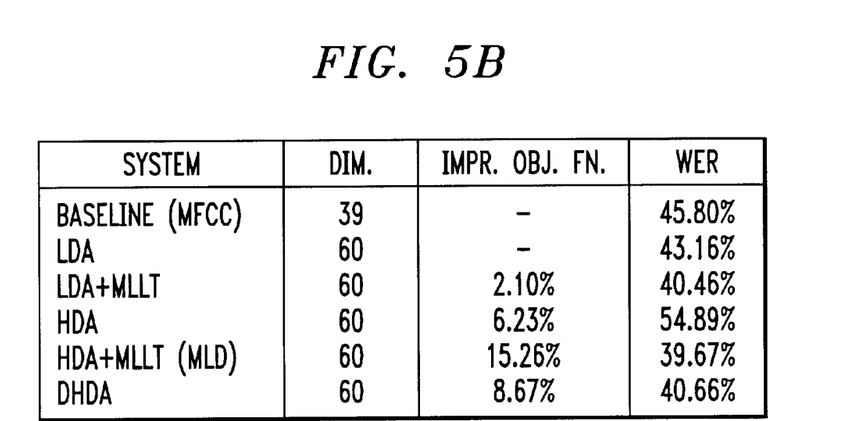

The second set of experiments was performed on the Switchboard database. The baseline system has 2801 context dependent states, 175K diagonal covariance prototypes and was trained on 70 hours of data (the '95 training set). Among the notable differences with the voicemail system is the dimensionality of the feature vectors in the transformed space (60 versus 39) and the use of right context across word boundaries during the search. The test set contains 10 randomly selected conversation sides from the CLSP WS'97 dev test set which has 25 conversations in all. The table of FIG. 5B provides a comparison between the different techniques.

Based on the previous results, the following conclusions may be drawn. First, considering the individual covariances of the classes in the objection function leads to better discrimination. Second, however, the clusters are skewed in the HDA space and it is preferable to "rectify" them by computing a subsequent diagonalizing transformation. Third, applying a maximum likelihood transform after the HDA projection is more efficient than incorporating the diagonal modeling assumption in the DHDA objective function.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for use in a pattern recognition system of processing feature vectors extracted from a pattern signal input to the system, the method comprising the steps of:

forming a projection matrix based on a heteroscedastic discriminant objective function which, when applied to the feature vectors extracted from the pattern signal, maximizes class discrimination in a resulting subspace associated with the feature vectors, while ignoring one or more rejected dimensions in the objective function; and applying the projection matrix to the feature vectors extracted from the pattern signal to generate transformed feature vectors for further processing in the pattern recognition system.

2. The method of claim 1, wherein the projection matrix forming step further comprises combining the heteroscedastic discriminant objective function with a maximum likelihood transform to form the projection matrix.

3. The method of claim 1, wherein the heteroscedastic discriminant objective function assumes that models associated with the function have diagonal covariances thereby resulting in a diagonal heteroscedastic discriminant objective function.

4. The method of claim 1, wherein subsequent feature space transformations of the range of the projection matrix do not affect the value of the objective function.

5. The method of claim 1, wherein the projection matrix is invariant to linear transformations of feature vectors associated with at least another input pattern signal.

6. The method of claim 1, wherein the heteroscedastic discriminant objective function is optimized via a gradient descent routine.

7. The method of claim 1, further comprising the step of classifying the transformed feature vectors.

8. The method of claim 7, further comprising the step of post-processing results of the classification step.

9. The method of claim 1, wherein the input pattern signal is representative of speech.

10. Apparatus for use in a pattern recognition system of processing feature vectors extracted from a pattern signal input to the system, the apparatus comprising:

at least one processor operative to: (i) form a projection matrix based on a heteroscedastic discriminant objective function which, when applied to the feature vectors extracted from the pattern signal, maximizes class discrimination in a resulting subspace associated with the feature vectors, while ignoring one or more rejected dimensions in the objective function; and (ii) apply the projection matrix to the feature vectors extracted from the pattern signal to generate transformed feature vectors for further processing in the pattern recognition system; and a memory, coupled to the at least one processor, to store at least one of the projection matrix and the transformed feature vectors.

11. The apparatus of claim 10, wherein the projection matrix forming operation further comprises combining the heteroscedastic discriminant objective function with a maximum likelihood transform to form the projection matrix.

12. The apparatus of claim 10, wherein the heteroscedastic discriminant objective function assumes that models associated with the function have diagonal covariances thereby resulting in a diagonal heteroscedastic discriminant objective function.

13. The apparatus of claim 10, wherein subsequent feature space transformations of the range of the projection matrix do not affect the value of the objective function.

14. The apparatus of claim 10, wherein the projection matrix is invariant to linear transformations of feature vectors associated with at least another input pattern signal.

15. The apparatus of claim 10, wherein the heteroscedastic discriminant objective function is optimized via a gradient descent routine.

16. The apparatus of claim 10, wherein the at least one processor is further operative to classify the transformed feature vectors.

17. The apparatus of claim 16, wherein the at least one processor is further operative to post-process results of the classification step.

18. The apparatus of claim 10, wherein the input pattern signal is representative of speech.

19. Apparatus for use in a speech recognition system of processing feature vectors extracted from a speech signal input to the system, the apparatus comprising:

at least one processor operative to: (i) form a projection matrix based on a heteroscedastic discriminant objective function which, when applied to the feature vectors extracted from the speech signal, maximizes class discrimination in a resulting subspace associated with the feature vectors, while ignoring one or more rejected dimensions in the objective function; and (ii) apply the projection matrix to the feature vectors extracted from the speech signal to generate transformed feature vectors for further processing in the speech recognition system; and a memory, coupled to the at least one processor, to store at least one of the projection matrix and the transformed feature vectors.

20. The apparatus of claim 19, wherein the projection matrix forming operation further comprises combining the heteroscedastic discriminant objective function with a maximum likelihood transform to form the projection matrix.

21. The apparatus of claim 19, wherein the heteroscedastic discriminant objective function assumes that models associated with the function have diagonal covariances thereby resulting in a diagonal heteroscedastic discriminant objective function.

* * * * *